United States Patent
Yau et al.

(10) Patent No.: US 11,532,980 B2
(45) Date of Patent: Dec. 20, 2022

(54) CONVERSION APPARATUS WITH OVERLOAD CONTROL AND OVERLOAD CONTROL METHOD FOR THE SAME

(71) Applicant: ASIAN POWER DEVICES INC., Taoyuan (TW)

(72) Inventors: Yeu-Torng Yau, Taoyuan (TW); Tsung-Liang Hung, Taoyuan (TW)

(73) Assignee: ASIAN POWER DEVICES INC., Taoyuan (TW)

(*) Notice: Subject to any disclaimer, the term of this patent is extended or adjusted under 35 U.S.C. 154(b) by 247 days.

(21) Appl. No.: 17/027,125

(22) Filed: Sep. 21, 2020

(65) Prior Publication Data

US 2021/0367506 A1 Nov. 25, 2021

(30) Foreign Application Priority Data

May 22, 2020 (TW) .................................. 109117109

(51) Int. Cl.
*H02M 1/42* (2007.01)
*H02M 3/00* (2006.01)
*H02M 1/32* (2007.01)
*H02M 1/00* (2006.01)

(52) U.S. Cl.
CPC ............ *H02M 1/32* (2013.01); *H02M 1/007* (2021.05); *H02M 1/4225* (2013.01); *H02M 1/4241* (2013.01); *H02M 3/01* (2021.05)

(58) Field of Classification Search
CPC .... H02M 1/0003; H02M 1/0016; H02M 1/42; H02M 1/4208; H02M 1/4216; H02M 1/4241; H02M 1/385; H02M 1/4225; H02M 1/425; H02M 1/4258; H02M 3/01; H02M 3/335; H02M 3/337; H02M 3/33507; H02M 7/155; Y02B 70/10

See application file for complete search history.

(56) References Cited

U.S. PATENT DOCUMENTS

| | | | |
|---|---|---|---|
| 8,654,483 B2* | 2/2014 | Etter .................... | H02M 1/4225 361/18 |
| 10,224,802 B1* | 3/2019 | Chakkirala ......... | H02M 3/3376 |
| 10,250,126 B1* | 4/2019 | Chen .................... | H02M 1/4241 |
| 10,534,029 B1* | 1/2020 | Tsai ..................... | H02M 3/3376 |
| 2015/0048807 A1* | 2/2015 | Fan ........................ | H02M 1/42 323/208 |

(Continued)

FOREIGN PATENT DOCUMENTS

TW 201935834 A 9/2019

OTHER PUBLICATIONS

Office Action issued in corresponding Taiwan patent application No. 109117109 dated Apr. 20, 2021 (5 pages).

*Primary Examiner* — Thienvu V Tran
*Assistant Examiner* — Shahzeb K Ahmad
(74) *Attorney, Agent, or Firm* — Muncy, Geissler, Olds & Lowe, P.C.

(57) ABSTRACT

A conversion apparatus with overload control includes a primary conversion circuit, a resonant conversion circuit, and a control unit. The control unit controls a voltage value of a DC power source outputted from the primary conversion circuit according to a current signal of an output current of the resonant conversion circuit. When the control unit realizes that the output current exceeds a rated current according to the current signal, the control unit steps up the voltage value of the DC power source.

8 Claims, 4 Drawing Sheets

(56) References Cited

U.S. PATENT DOCUMENTS

| | | | |
|---|---|---|---|
| 2016/0105095 A1* | 4/2016 | Mayell | H02M 1/4225 |
| | | | 323/205 |
| 2019/0044434 A1* | 2/2019 | Elferich | H02M 1/08 |
| 2019/0115837 A1* | 4/2019 | Fahlenkamp | H02M 3/33507 |
| 2019/0202300 A1* | 7/2019 | Pastor | H02J 7/04 |
| 2020/0220452 A1* | 7/2020 | Lim | H02M 1/4208 |
| 2021/0399620 A1* | 12/2021 | Mayell | H02M 3/33571 |
| 2022/0158536 A1* | 5/2022 | Jaksa | H02M 3/33592 |

* cited by examiner

CONVERSION APPARATUS WITH OVERLOAD CONTROL AND OVERLOAD CONTROL METHOD FOR THE SAME

BACKGROUND

Technical Field

The present disclosure relates to a conversion apparatus with overload control and an overload control method for the conversion apparatus, and more particular to a conversion apparatus with overload control having a resonant conversion circuit and an overload control method for the conversion apparatus.

Description of Related Art

The statements in this section merely provide background information related to the present disclosure and do not necessarily constitute prior art.

In the current power electronics field, switching power conversion apparatuses are increasingly widely used due to the requirements of high efficiency and high power density. However, the load coupled to the back end is more and more extensive for the functional requirements of the switching power conversion apparatuses, which includes the requirements of the (received) voltage quality, the communication ability, and the short-term overload. Especially, loads (such as but not limited to servers, etc.) have more and more powerful functions for processing data, which leads to an increasing demand for loads to provide overload functions for switching power conversion apparatuses.

On the other hand, since LLC resonant converters have remarkable characteristics such as high output power and high conversion efficiency, LLC resonant converters are widely used in switching power conversion apparatuses. Once the switching power conversion apparatus uses an overload function, however, it needs to provide a peak power output of more than twice the rated power in a short time. When the LLC resonant converter is used as the switching power conversion apparatus, a large amount of reverse recovery current is generated to flow through power switches inside the LLC resonant converter due to the too-low switching frequency of the LLC resonant converter, thereby causing the power switches to be easily damaged by overheat due to the overload condition.

SUMMARY

In order to solve the above-mentioned problems, a conversion apparatus with overload control is provided. The conversion apparatus with overload control includes a primary conversion circuit, a resonant conversion circuit, and a control unit. The primary conversion circuit converts an input power source into a DC power source. The resonant conversion circuit converts the DC power source into an output power source. The control unit is coupled to the primary conversion circuit and the resonant conversion circuit. The control unit controls a voltage value of the DC power source according to a current signal of an output current of the resonant conversion circuit. When the control unit realizes that the output current exceeds a rated current according to the current signal, the control unit steps up the voltage value of the DC power source.

In one embodiment, when the output current exceeds the rated current so that a switching frequency of the resonant conversion circuit is decreased to a critical switching frequency to make the resonant conversion circuit want to enter a zero current switching, the control unit steps up the voltage value of the DC power source to make the switching frequency be higher than the critical switching frequency and maintain the resonant conversion circuit in a zero voltage switching.

In one embodiment, when the switching frequency is decreased, a voltage gain of the resonant conversion circuit is increased, and when the voltage value of the DC power source is increased, the switching frequency is increased.

In one embodiment, the control unit includes a feedback circuit, a compensator, and a PWM controller. The feedback circuit receives the DC power source and the current signal. The compensator is coupled to the feedback circuit. The PWM controller is coupled to the compensator. The feedback circuit provides an error signal to the compensator according to the DC power source and the current signal, and the compensator provides a compensation signal to the PWM controller according to the error signal, and the PWM controller provides a PWM signal to the primary conversion circuit according to the compensation signal to adjust the voltage value of the DC power source.

In one embodiment, the feedback circuit includes a first gain controller, a second gain controller, and a feedback controller. The first gain controller provides a DC voltage gain according to the DC power source. The second gain controller provides an output current gain according to the current signal. The feedback controller provides the error signal according to the DC voltage gain, the output current gain, and a reference voltage.

In one embodiment, the control unit further includes an on-off circuit. The on-off circuit is coupled to the resonant conversion circuit. When the on-off circuit realizes that the output current exceeds the rated current according to the current signal, the on-off circuit activates the control unit so that the control unit steps up the voltage value of the DC power source according to the current signal.

In order to solve the above-mentioned problems, an overload control method for a conversion apparatus is provided. The overload control method includes steps of: (a) controlling a primary conversion circuit to convert an input power source into a DC power source, (b) controlling a resonant conversion circuit to convert the DC power source into an output power source, (c) controlling a voltage value of the DC power source according to a current signal of an output current of the resonant conversion circuit, and (d) stepping up the voltage value of the DC power source when the output current exceeds a rated current according to the current signal.

In one embodiment, step (d) includes a step of: (d0) stepping up the voltage value of the DC power source to make the switching frequency be higher than the critical switching frequency and maintain the resonant conversion circuit in a zero voltage switching when the output current exceeds the rated current so that a switching frequency of the resonant conversion circuit is decreased to a critical switching frequency to make the resonant conversion circuit want to enter a zero current switching.

In one embodiment, step (d) includes steps of: (d1) generating an error value according to the DC power source and the current signal, and providing an error signal according to the error value, (d2) generating a compensation value according to the error signal, and providing a compensation signal according to the compensation value, and (d3) generating a PWM signal according to the compensation signal and controlling the primary conversion circuit to adjust the voltage value of the DC power source through the PWM signal.

In one embodiment, step (c) includes steps of: (c0) enabling a function of stepping up the voltage value of the DC power source when realizing that the output current exceeds the rated current according to the current signal, and stepping up the voltage value of the DC power source according to the current signal, and (c1) disabling the function of stepping up the voltage value of the DC power source when realizing that the output current is lower than the rated current according to the current signal, and maintaining the voltage value of the DC power source at a predetermined working voltage value.

The main purpose and effect of the conversion apparatus with overload control having a resonant conversion circuit of the present disclosure is that the voltage value of the DC power source is stepped up by controlling the primary conversion circuit when the load is instantly drawn too much and the output current exceeds the rated current so as to avoid causing the power switches inside the resonant conversion circuit to be easily damaged by overheat due to too-low switching frequency while the load is overloaded for a short time.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
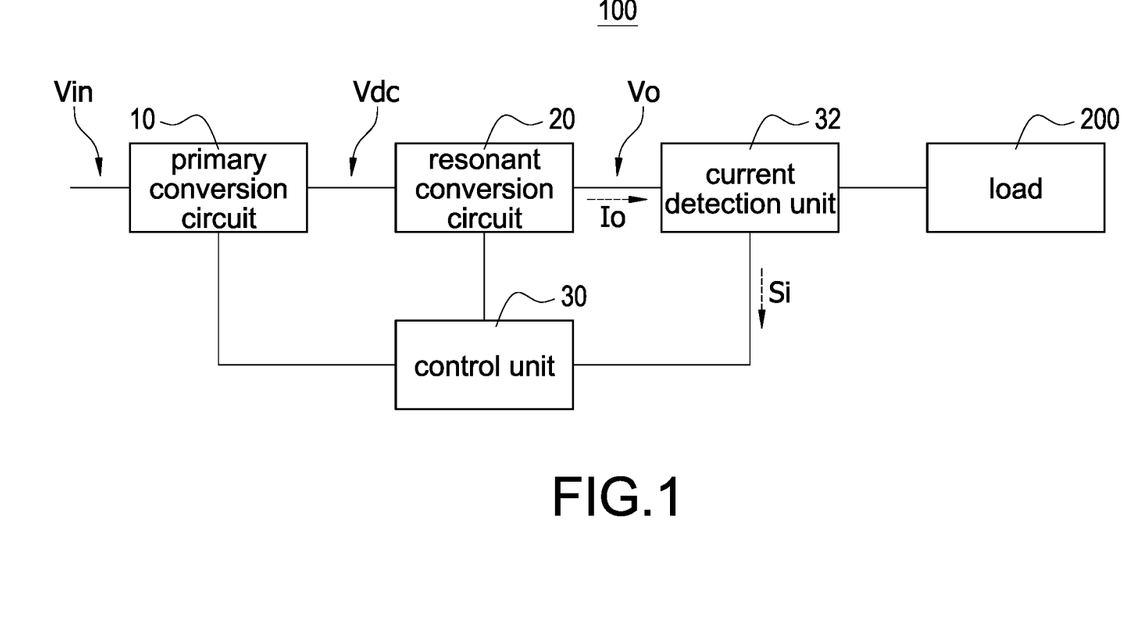
FIG. 1 is a block diagram of a conversion apparatus with overload control according to the present disclosure.

Please refer to FIG. 1, which shows a block diagram of a conversion apparatus with overload control according to the present disclosure. The conversion apparatus 100 receives an input power source Vin and is coupled to a load 200. The conversion apparatus 100 includes a primary conversion circuit 10, a resonant conversion circuit 20, and a control unit 30. An output end of the primary conversion circuit 10 is coupled to the resonant conversion circuit 20. The control unit 30 is coupled to the primary conversion circuit 10 and the resonant conversion circuit 20. The primary conversion circuit 10 receives the input power source Vin and converts the input power source Vin into the DC power source Vdc. The resonant conversion circuit 20 receives the DC power source Vdc and converts the DC power source Vdc into an output power source Vo. The conversion apparatus 100 further includes a current detection unit 32. The current detection unit 32 is coupled to an output end of the resonant conversion circuit 20 and detects an output current Io of the resonant conversion circuit 20. When the output current Io flows through the current detection unit 32, the current detection unit 32 generates a current signal Si according to the output current Io and provides the current signal Si to the control unit 30. The control unit 30 controls a voltage value of the DC power source Vdc according to the current signal Si to provide control mode of the overload control.

Specifically, when the required power of the load 200 is gradually increased (i.e., the output current Io drawn is gradually increased), a voltage value of the output power source Vo is decreased. In order to maintain the voltage value of the output power source Vo, the resonant conversion circuit 20 will decrease its own switching frequency. If the switching frequency is too low, however, power switches inside the resonant conversion circuit 20 will generate high switching losses and cause the power switches to overheat and burn. Therefore, the circuit design of the conventional resonant conversion circuit 20 will limit the output current Io to be less than the rated current to avoid overheating and burning of the power switches. However, since the load 200 often needs to be overloaded for a short time, the resonant conversion circuit 200 is easily damaged due to the overload requirement of the load 200 if the conventional control manner is used. The main object of the present disclosure is to provide the resonant conversion circuit 20 with overload control and an overload control method for the resonant conversion circuit 20. When the output current Io exceeds the rated current since the load 200 is instantly drawn too much, the control unit 30 realizes that the output current Io exceeds the rated current according to the current signal Si. At this condition, the control unit 30 controls the primary conversion circuit 10 to step up (increase) the voltage value of the DC power source Vdc so as to avoid overheating and burning of the power switches inside the resonant conversion circuit 20 due to the too-low switching frequency when the load 200 needs to be overloaded for a short time. The detailed description of the conversion apparatus 100 will be made hereinafter.

Figure 2A:
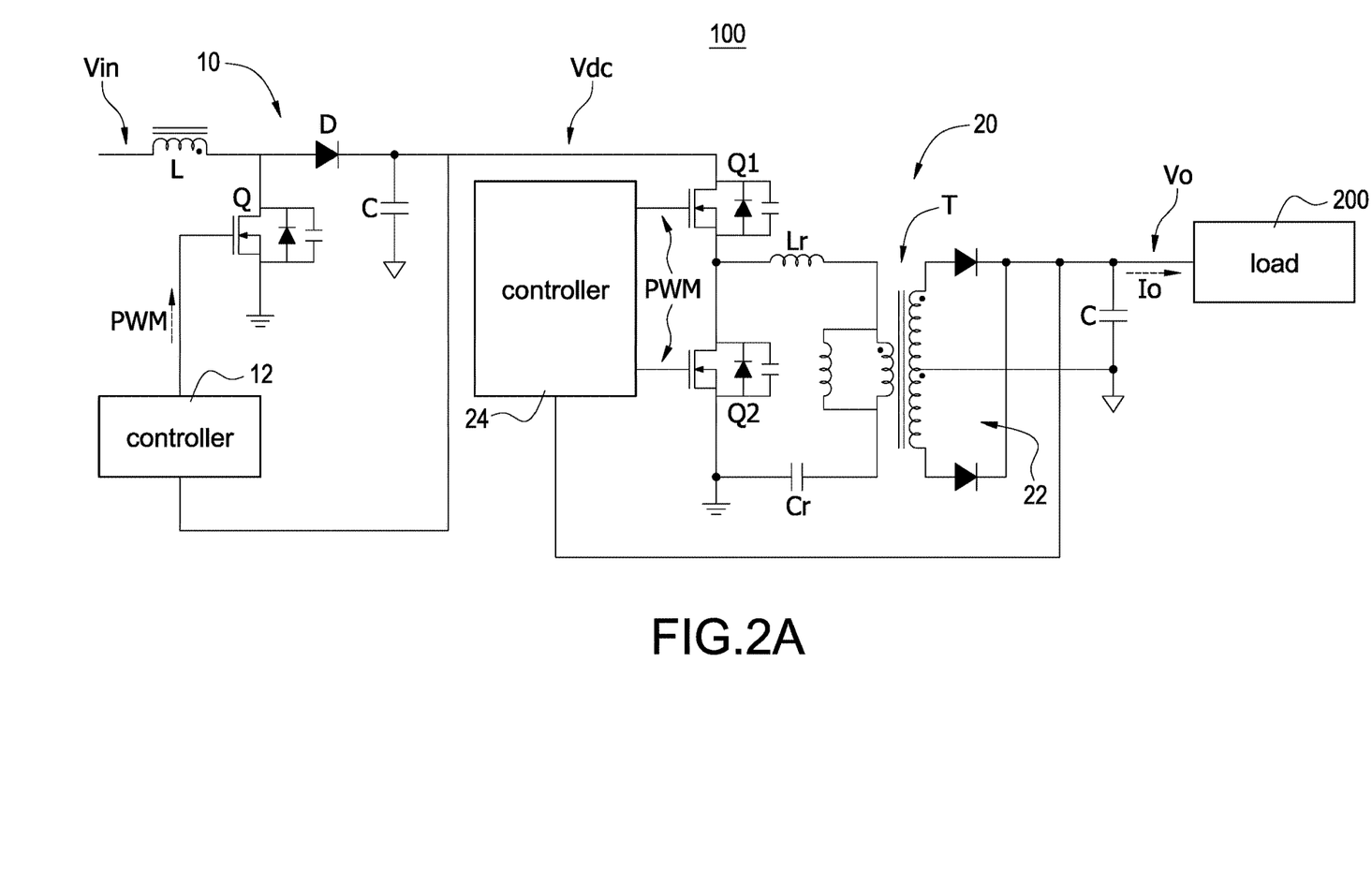
FIG. 2A is a block circuit diagram of the conversion apparatus with overload control according to the present disclosure.

Please refer to FIG. 2A, which shows a block circuit diagram of the conversion apparatus with overload control according to the present disclosure, and also refer to FIG. 1. The primary conversion circuit 10 is a switching converter with or without a transformer. In addition, the primary conversion circuit 10 is a step-up converter, such as a boost converter or a step-down converter, such as a buck converter. In the present disclosure, the boost converter is preferably suitable as the primary conversion circuit 10. Take the boost converter as an example, the primary conversion circuit 10 includes a power inductor L, a power switch Q, a power diode D, and a controller 12. The power inductor L is coupled to the power diode Q and the power diode D, and the controller 12 is coupled to the power switch Q. The controller 12 controls switching of the power switch Q to control the primary conversion circuit 10 converting the input power source Vin into the DC power source Vdc, and a PWM signal provided to the power switch Q is adjusted according to the feedback of the DC power source Vdc, thereby stabilizing (maintaining) the voltage value of the DC power source Vdc at a predetermined working voltage value, such as 400 volts. In one embodiment, the primary conversion circuit 10 is a power factor correction (PFC) to provide a higher power factor to reduce the consumption of reactive power of the input power source Vin, such as a mains.

The resonant conversion circuit 20 is a switching converter, such as a LLC resonant converter. The resonant conversion circuit 20 includes a switching unit (Q1,Q2), a resonant tank (Lr,Cr), a transformer T, a rectifying circuit 22, and a controller 24. The resonant tank (Lr,Cr) is coupled to the switching unit (Q1,Q2) and a primary side of the transformer T, and a secondary side of the transformer T is coupled to the rectifying circuit 22. The controller 24 controls switching of the switching unit (Q1,Q2) to control the resonant conversion circuit 20 converting the DC power source Vdc into the output power source Vo (from the primary side of the transformer T to the secondary side thereof), and PWM signals provided to the switching unit (Q1,Q2) are adjusted according to the feedback of the output power source Vo, thereby stabilizing (maintaining) the voltage value of the output power source Vo at a predetermined working voltage value.

Figure 2B:
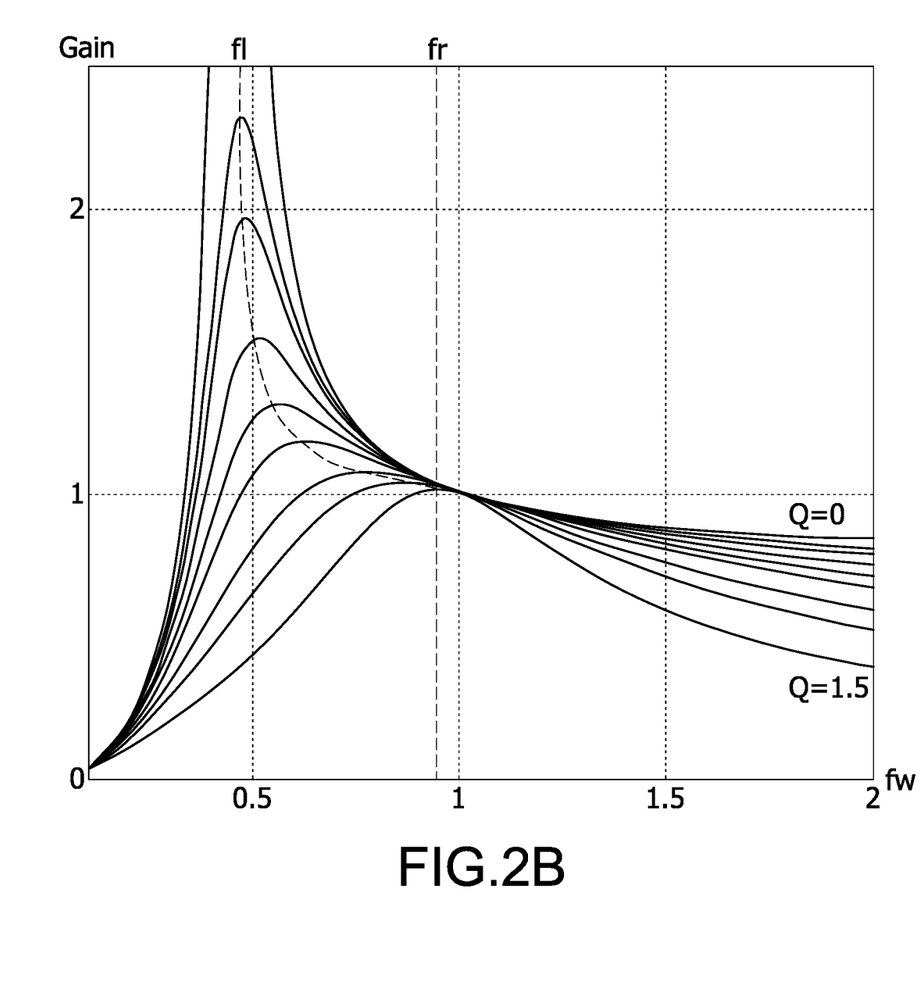
FIG. 2B is a gain curve of a resonant conversion circuit according to the present disclosure.

Please refer to FIG. 2B, which shows a gain curve of a resonant conversion circuit according to the present disclosure, and also refer to FIG. 1. The longitudinal axis of FIG. 2 represents a voltage gain (Gain) of the resonant conversion circuit 20, and the voltage gain is equal to twice of the turn ratio of the transformer T multiplied by Vo/Vdc; the transverse axis represents a switching frequency (fw) of the resonant conversion circuit 20. The Q-value curve in FIG. 2B represents the voltage gain curve under different switching frequencies and changes of the load 200. In particular, the peak values of the Q-value curve are the peak gains of the curve. When the load 200 becomes lighter, the peak gain is increased, and when the load 200 becomes heavier, the peak gain is decreased. In particular, a critical switching frequency fl is determined by a connection of the peak gains. Further, the resonant frequency fr is represented by a dotted line, and the gain at the resonant frequency fr is fixed, i.e., the gain is not changed with the variation of the load 200. As shown in FIG. 2B, two regions are divided by the connection of the peak gains. In the right of the critical switching frequency fl, a zero voltage switching (ZVS) region or an inductive region is called; in the left of the critical switching frequency fl, a zero current switching (ZCS) region (or a third region) or a capacitive region is called. In the ZVS region, a region in the right of the resonant frequency fr represented by the dotted line is called as an above region (or a first region); a region between the critical switching frequency fl and the resonant frequency fr represented by the dotted line is called as a below region (or a second region).

Specifically, when the resonant conversion circuit 20 operates in the third region and the controller 24 controls switching of the switching unit (Q1,Q2), a large amount of reverse recovery current is generated to flow through the switching unit (Q1,Q2) at the switching moment, thereby causing the switching unit (Q1,Q2) to be easily damaged by overheat. Therefore, the resonant conversion circuit 20 has to operate in the first region and the second region. That is, the switching frequency fw of the resonant conversion circuit 20 is controlled to be higher than the critical switching frequency fl so that the switching unit (Q1,Q2) is controlled by the resonant conversion circuit 20 in the zero voltage switching. When the load 200 becomes heavier, however, the controller 24 of the resonant conversion circuit 20 reduces the switching frequency fw to increase the voltage gain Gain so that the voltage value of the output power source Vo ban be maintained at the predetermined working voltage value. Because of the reduction of the switching frequency fw, the switching frequency fw gradually moves to the left of the gain curve so that the switching frequency fw gradually approaches the second region. When the output current Io exceeds the rated current since the load 200 is instantly drawn too much, the switching frequency fw of the resonant conversion circuit 20 reduces below the critical switching frequency fl so that the switching unit (Q1,Q2) is controlled by the resonant conversion circuit 20 in the zero current switching. At this condition, the switching frequency fw will fall into the second region to cause a large amount of reverse recovery current flowing through the switching unit (Q1,Q2) at the switching moment.

The resonant conversion circuit 20 needs to control the switching unit (Q1,Q2) operating in the ZVS region, and therefore the switching frequency fw is controlled to maintain in the first region or in the second region and avoid in the third region. When the output current Io exceeds the rated current since the load 200 is instantly drawn too much, the control unit 30 steps up the voltage value of the DC power source Vdc to avoid the switching frequency fw of the resonant conversion circuit 20 in the third region (i.e., the ZCS region). The reason is: when the voltage value of the DC power source Vdc received by the resonant conversion circuit 20 is stepped up, the switching frequency fw of the resonant conversion circuit 20 will be increased so that the switching frequency fw moves to the right of the gain curve before the switching frequency fw falls into the third region. Therefore, the control mode of the overload control for the resonant conversion circuit 20 is: when the output current Io exceeds the rated current since the load 200 is instantly drawn too much, the voltage value of the DC power source Vdc of the primary conversion circuit 10 is stepped up to reduce the reduction range of the switching frequency fw of the resonant conversion circuit 20 when the load becomes heavier, thereby avoiding the switching frequency fw fall into the third region.

Figure 3:
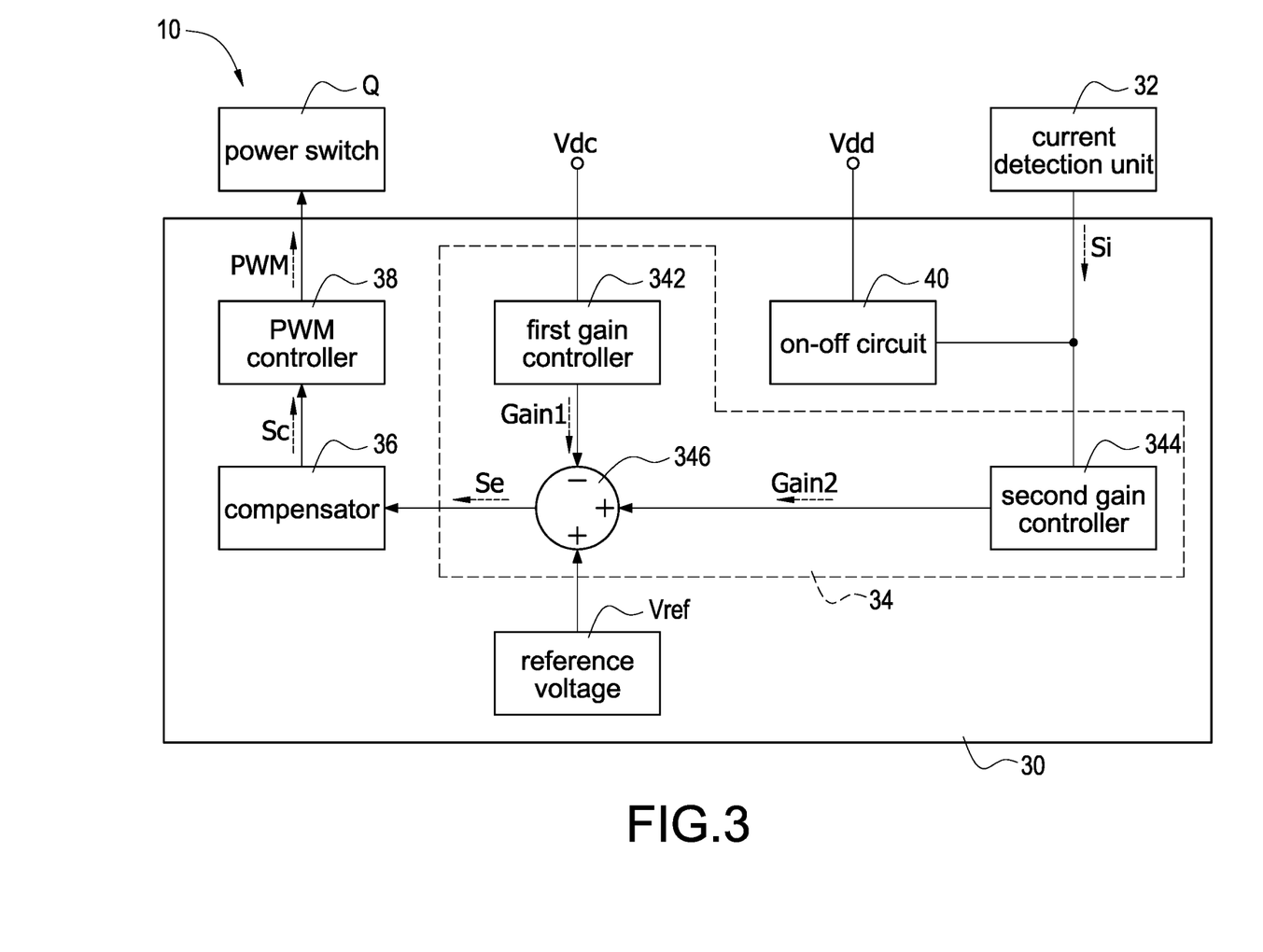
FIG. 3 is a circuit control block diagram of a control unit according to the present disclosure.

Please refer to FIG. 3, which shows a circuit control block diagram of a control unit according to the present disclosure, and also refer to FIG. 1 to FIG. 2B. The control unit 30 includes a feedback circuit 34, a compensator 36, and a PWM controller 38. The feedback circuit 34 includes a first gain controller 342, a second gain controller 344, and a feedback controller 346. The first gain controller 342 is coupled to the output end of the primary conversion circuit 10 and provides a DC voltage gain Gain1 according to the DC power source Vdc. The second gain controller 344 is coupled to the current detection unit 32 and provides an output current gain Gain2 according to the current signal Si. The feedback controller 346 receives the DC voltage gain Gain1, the output current gain Gain2, and a reference voltage Vref, generates an error value according to the DC voltage gain Gain1, the output current gain Gain2, and the reference voltage Vref, and provides an error signal Se according to the error value.

Specifically, the DC voltage gain Gain1 is a voltage division value, which can be acquired by dividing the voltage value of the DC power source Vdc by, for example but not limited to, a voltage division circuit (not shown). The output current gain Gain2 is a voltage value corresponding to the output current Io, which can be acquired by the current signal Si provided by the current detection unit 32. The feedback controller 346 is, for example but not limited to, an error amplifier, and a voltage difference value (i.e., a voltage error value) among the DC voltage gain Gain1, the output current gain Gain2, and the reference voltage Vref can be amplified and provided to the compensator 36. The compensator 36 is coupled to the feedback controller 346 of the feedback circuit 34, generates a compensation value according to an error signal Se, and provides a compensation signal Sc according to the compensation value. The PWM controller 38 is coupled to the compensator 36 and generates a PWM signal PWM according to the compensation signal Sc. The PWM signal PWM is provided to the power switch Q of the primary conversion circuit 10 to control switching of the power switch Q to control and adjust the voltage value of the DC power source Vdc.

According to the connection relationship between the control unit 30 shown in FIG. 3 and the primary conversion circuit 10 and resonant conversion circuit 20 shown in FIG. 2A, the primary conversion circuit 10 has the controller 12 and the resonant conversion circuit 20 has the controller 24, and the control unit 30 is a controller that is related to controlling the primary conversion circuit 10 and the resonant conversion circuit 20. When the output current Io exceeds the rated current since the load 200 is instantly drawn too much, the control unit 30 has to control the resonant conversion circuit 20 according to the DC voltage gain Gain1 and the output current gain Gain2 of the primary conversion circuit 10 and resonant conversion circuit 20. That is, the control unit 30 has to control the primary conversion circuit 10 and resonant conversion circuit 20 according to the parameters provided by the primary conversion circuit 10 and resonant conversion circuit 20 so as to provide the control mode of the overload control. Some components of the control unit 30 can be integrated into the controller 12 of the primary conversion circuit 10, for example but not limited to, the PWM controller 38 of the control unit 30 can be integrated into a PWM controller (not shown) inside the controller 12. When the control mode of the overload control of the conversion apparatus 100 is not performed, a PWM controller (not shown) inside the controller 12 provides the PWM signal PWM to control the power switch Q so that the voltage value of the DC power source Vdc is maintained at the predetermined working voltage value. When the control mode of the overload control of the conversion apparatus 100 is performed, the PWM controller (not shown) inside the controller 12 receives the compensation signal Sc to generate the PWM signal PWM to control the power switch Q so that the voltage value of the DC power source Vdc is stepped up to higher than the predetermined working voltage value.

Please refer to FIG. 3 again, the control unit 30 further includes an on-off circuit 40. The on-off circuit 40 is coupled to the resonant conversion circuit 20 through the current detection unit 32. The on-off circuit 40 is provided to control turning-on and turning-off of the control unit 30 so as to reduce power consumption (save power loss) of the conversion apparatus 100. Specifically, when the on-off circuit 40 of the control unit 30 realizes that the output current Io is lower than the rated current according to the current signal Si, the control unit 30 is turned off by the on-off circuit 40, thereby disabling a function of stepping up the voltage value of the DC power source Vdc. At this condition, the primary conversion circuit 10 maintains the voltage value of the DC power source Vdc at the predetermined working voltage value by controlling switching of the power switch Q. Therefore, the control unit 30 is turned off to save power consumption when the conversion apparatus 100 is not necessary to provide the control mode of the overload control. When the on-off circuit 40 realizes that the output current Io is higher than (exceeds) the rated current according to the current signal Si, the control unit 30 is turned on by the on-off circuit 40 so that the control unit 30 controls the primary conversion circuit 10 to step up the voltage value of the DC power source Vdc according to the current signal Si. Accordingly, the control mode of the overload control is performed when the conversion apparatus 100 has a demand for overload control.

In one embodiment, some components of the control unit 30 can be implemented by the analog circuit described above, that is, the circuit with the same effect can be implemented by the circuit components. Alternatively, the control unit 30 can also integrate the circuit components described above into a single control IC by using IC manufacturing technology, or use its control method (manner) to write software programs into a single control IC to implement the control unit 30. The on-off circuit 40 can, for example but not limited to, be coupled to the path providing power to the control unit (i.e., a working power source Vdd). When the control unit 30 needs to be turned off, a switch connected to the control unit 30 can be turned off to disconnect the power providing to the control unit 30.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A conversion apparatus with overload control, comprising:
   a primary conversion circuit configured to convert an input power source into a DC power source,
   a resonant conversion circuit configured to convert the DC power source into an output power source, and
   a control unit coupled to the primary conversion circuit and the resonant conversion circuit,
   wherein the control unit is configured to control a voltage value of the DC power source according to a current signal of an output current of the resonant conversion circuit; when the control unit is configured to realize that the output current exceeds a rated current according to the current signal, the control unit is configured to step up the voltage value of the DC power source, and
   wherein when the output current exceeds the rated current so that a switching frequency of the resonant conversion circuit is decreased to a critical switching frequency to make the resonant conversion circuit want to enter a zero current switching, the control unit is configured to step up the voltage value of the DC power source to make the switching frequency be higher than the critical switching frequency and maintain the resonant conversion circuit in a zero voltage switching.

2. The conversion apparatus with overload control in claim 1, wherein when the switching frequency is decreased, a voltage gain of the resonant conversion circuit is increased, and when the voltage value of the DC power source is increased, the switching frequency is increased.

3. The conversion apparatus with overload control in claim 1, wherein the control unit comprises:
   a feedback circuit configured to receive the DC power source and the current signal,
   a compensator coupled to the feedback circuit, and
   a PWM controller coupled to the compensator,
   wherein the feedback circuit is configured to provide an error signal to the compensator according to the DC power source and the current signal, and the compensator is configured to provide a compensation signal to the PWM controller according to the error signal, and the PWM controller is configured to provide a PWM signal to the primary conversion circuit according to the compensation signal to adjust the voltage value of the DC power source.

4. The conversion apparatus with overload control in claim 3, wherein the feedback circuit comprises:
- a first gain controller configured to provide a DC voltage gain according to the DC power source,
- a second gain controller configured to provide an output current gain according to the current signal, and
- a feedback controller configured to provide the error signal according to the DC voltage gain, the output current gain, and a reference voltage.

5. The conversion apparatus with overload control in claim 3, wherein the control unit further comprises:
- an on-off circuit coupled to the resonant conversion circuit,
- wherein when the on-off circuit realizes that the output current exceeds the rated current according to the current signal, the on-off circuit is configured to activate the control unit so that the control unit is configured to step up the voltage value of the DC power source according to the current signal.

6. An overload control method for a conversion apparatus, comprising steps of:
- (a) controlling a primary conversion circuit to convert an input power source into a DC power source,
- (b) controlling a resonant conversion circuit to convert the DC power source into an output power source,
- (c) controlling a voltage value of the DC power source according to a current signal of an output current of the resonant conversion circuit,
- (d) stepping up the voltage value of the DC power source when the output current exceeds a rated current according to the current signal, and
- (d0) stepping up the voltage value of the DC power source to make the switching frequency be higher than the critical switching frequency and maintain the resonant conversion circuit in a zero voltage switching when the output current exceeds the rated current so that a switching frequency of the resonant conversion circuit is decreased to a critical switching frequency to make the resonant conversion circuit want to enter a zero current switching.

7. The overload control method for the conversion apparatus in claim 6, wherein step (d) comprises steps of:
- (d1) generating an error value according to the DC power source and the current signal, and providing an error signal according to the error value,
- (d2) generating a compensation value according to the error signal, and providing a compensation signal according to the compensation value, and
- (d3) generating a PWM signal according to the compensation signal and controlling the primary conversion circuit to adjust the voltage value of the DC power source through the PWM signal.

8. The overload control method for the conversion apparatus in claim 6, wherein step (c) comprises steps of:
- (c0) enabling a function of stepping up the voltage value of the DC power source when realizing that the output current exceeds the rated current according to the current signal, and stepping up the voltage value of the DC power source according to the current signal, and
- (c1) disabling the function of stepping up the voltage value of the DC power source when realizing that the output current is lower than the rated current according to the current signal, and maintaining the voltage value of the DC power source at a predetermined working voltage value.

* * * * *